United States Patent
Yamashita et al.

(10) Patent No.: US 6,628,593 B1
(45) Date of Patent: Sep. 30, 2003

(54) DISK DRIVE USING PLURAL OPTICAL HEADS, CAPABLE OF IDENTIFYING THE TYPES OF MEDIA

(75) Inventors: Tatsumaro Yamashita, Miyagi-ken (JP); Yasuaki Kameyama, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 542 days.

(21) Appl. No.: 09/606,775

(22) Filed: Jun. 28, 2000

(30) Foreign Application Priority Data

Jul. 2, 1999 (JP) .......................................... 11-188489

(51) Int. Cl.$^7$ ................................................. G11B 7/00
(52) U.S. Cl. .................................................. 369/53.22
(58) Field of Search ........................ 369/30.27, 30.29, 369/44.26, 44.27, 53.2, 53.22, 53.23, 53.37, 44.37, 94

(56) References Cited

U.S. PATENT DOCUMENTS

| | | | |
|---|---|---|---|
| 5,109,374 A | * | 4/1992 | Tsunoda et al. ............. 369/100 |
| 5,757,737 A | * | 5/1998 | Tanaka ..................... 369/30.22 |
| 5,859,822 A | * | 1/1999 | Inoue et al. .............. 359/53.22 |
| 5,917,791 A | | 6/1999 | Tsuchiya et al. |
| 6,097,690 A | * | 8/2000 | Mochizuki et al. .... 369/112.24 |
| 6,288,988 B1 | * | 9/2001 | Kumagai .................. 369/44.29 |
| 6,370,104 B1 | * | 4/2002 | Chao et al. ............. 369/112.28 |

FOREIGN PATENT DOCUMENTS

| | | |
|---|---|---|
| EP | 0 862 164 A2 | 2/1998 |
| JP | 01 117073 | 5/1989 |
| JP | 10 199122 | 7/1998 |
| JP | 10 208368 | 8/1998 |
| JP | 10 154348 | 9/1998 |
| JP | 11 149650 | 6/1999 |

\* cited by examiner

Primary Examiner—Thang V. Tran
Assistant Examiner—Bach Vuong
(74) Attorney, Agent, or Firm—Brinks Hofer Gilson & Lione

(57) ABSTRACT

When an optical disk is loaded, the light source provided with the optical head for the CD and the light source provided with the optical head for the DVD simultaneously irradiate the laser beams of different wavelengths each toward the optical disk D. And, the optical heads for the CD and DVD are simultaneously driven in parallel in the focusing direction. At that moment, the optical head for the CD and the optical head for the DVD simultaneously detect all the signals added and the RF envelopes individually, which are stored in the memory at the same time. All the signals added and the RF envelopes stored in the memory are sent to the control unit, where a specified processing is carried out to identify the specification of the disk.

6 Claims, 4 Drawing Sheets

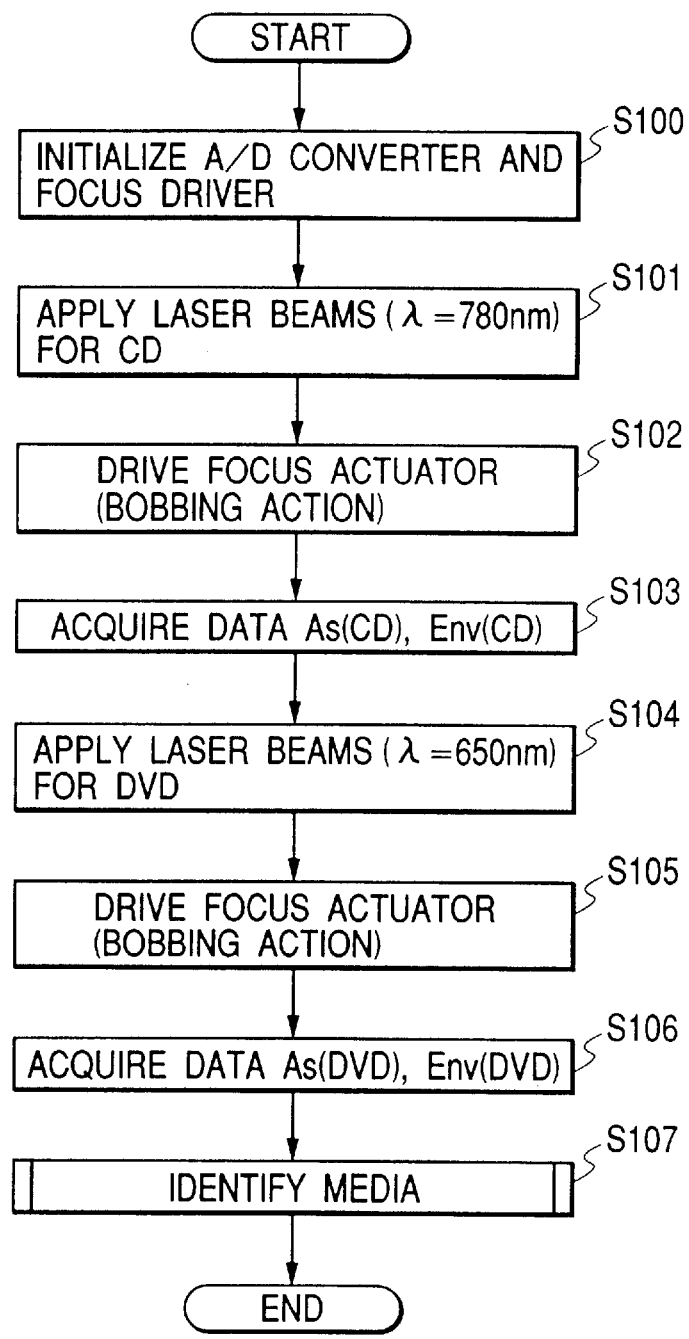

DISK DRIVE USING PLURAL OPTICAL HEADS, CAPABLE OF IDENTIFYING THE TYPES OF MEDIA

BACKGROUND OF THE INVENTION

1. Field of the Invention

This invention relates to a disk drive capable of loading media of different specifications, specifically to a disk drive that can automatically identify the types of loaded media.

2. Description of the Related Art

A disk drive is used as a storage device that can handle mass data contained in a CD (compact Disc) or a DVD (Digital Versatile Disc) or the like for use in a computer, etc.

The CD and DVD have various types of specifications, for example, the CD-ROM (CD-Read Only Memory) or DVD-ROM (DVD-Read Only Memory) as the reproduction exclusive, the CD-R (CD-Recordable) or DVD-R (DVD-Recordable) that accepts writing only once, and the CD-RW (CD-ReWritable) or DVD-RAM (DVD-Random Access Memory) that accepts writing repeatedly. In accordance with the different specifications of the disks each, the disk drive suited to the specification of each disk is to be used.

The above different types of disks have a predetermined diameter, although the inner structures of the disks are different (positions of the recording layers). Accordingly, one disk drive can be made to comply with the disks of plural specifications. In this case, plural optical heads are provided in order to comply with the disks of different specifications.

FIG. 5 illustrates a flow chart, in which the individual specifications of the different disks are identified in a conventional disk drive. Here, in FIG. 5, the flow chart assumes a disk drive that is compatible to both the CD and the DVD.

As shown in FIG. 5, when a disk is loaded, the A/D converter and the focus driver are initialized to eliminate the offset components and the noise components (S100). At this moment, the focus correction unit is not locked yet, and the detection laser beams are not irradiated either.

After the initialization, the light emitting unit (light source) provided with the optical pickup (optical head) for CD irradiates the laser beams of the wavelength 780 nm toward the disk through a specified optical system (S101). The focus actuator (focus drive unit) energized drives the objective lens in the focusing direction in a low speed (bobbling motion) (S102). The detection signal of the reflected light returned from the disk surface is acquired, and the quantity of light (all the signals added: As) of the total reflected light and the level (RF envelope: Env) generated at the focused point during the bobbling motion are detected, and these signals are recorded in the memory (S103).

And, after the foregoing operation by the optical head for CD is completed, the light emitting unit (light source) provided with the optical pickup (optical head) for DVD irradiates the laser beams of the wavelength 650 nm toward the disk (S104). Next, the focus actuator drives the objective lens in the focusing direction (bobbling motion) (S105). And, all the signals added (As) and RF envelope (Env) are detected, which are recorded in the memory (S106). At the final stage, the specification of the disk loaded is identified (S107), and the optical head conformable to the specification of the disk loaded is selected, terminating the processing.

Thus, the conventional disk drive provided with the plural light sources of different wavelengths performs the identification of CD and the identification of DVD separately, which needs a very long time for the identification.

That is, in the identification of the CD and DVD, when both the disks are loaded, the focus actuator moves the optical head in the focusing direction to identify the disk; but at this moment, the movement of the optical head is very slow, and besides, when the plural optical heads are provided in order to make it possible to use the disks of different specifications, the identification of the CD and DVD needs double the time.

SUMMARY OF THE INVENTION

The present invention has been made in view of the foregoing problem, and it is an object of the invention to provide a disk drive that can identify the different specifications of the disks in a shorter time, while the disk drive is provided with different light sources of plural wavelengths.

According to one aspect of the invention, the disk drive is provided with a plurality of optical heads each provided with light emitting systems and light receiving systems and drive means that drive objective lenses for condensing lights on a media in the focusing direction and the tracking direction, in which the light emitting systems of a plurality of the optical heads are provided with light sources each capable of emitting lights of each different wavelengths. In this construction, when a media is loaded, the light emitting systems of a plurality of the optical heads simultaneously irradiate detection lights to the media, and the light receiving systems of the optical heads each detect reflected lights from the media. Further, the disk drive is provided with a memory that stores light receiving signals detected by the light receiving systems of the optical heads each and an identification means that judges values stored by the memory and identifies the type of the media.

According to another aspect of the invention, in the disk drive, a plurality of the optical heads each drive the objective lenses simultaneously in the focusing direction at least one time, and the memory stores the peak values of the total quantities of lights (all the signals added) of the reflected lights received by the light receiving systems of the optical heads each and the peak values of RF envelopes obtained when the detection lights are focused on the media.

The aforementioned implements make it unnecessary to separately operate the optical heads each and separately perform the processes, as the identification operation in the conventional disk drive, thereby reducing the time for identifying the type of the media.

According to another aspect of the invention, the identification means compares all the signals added with preset reference values to thereby judge whether the media is loaded or not.

According to another aspect of the invention, the peak values of all the signals added and/or the peak values of the RF envelopes are compared with the preset reference values to identify specifications of the media.

Further, in this invention, preferably the reference values are obtained from actual measurements and stored to be read out by the identification means.

Thus, according to the invention, the identification of the specifications of the CD and the DVD can be made in a shorter time, and moreover, the specifications of the disks, such as the CD-ROM, CD-R, CD-RW as the CD system, and the single layer DVD-ROM, double layer DVD-ROM, DVD-RAM as the DVD system can be identified in a shorter time.

BRIEF DESCRIPTION OF THE DRAWINGS

FIG. 5 is a flow chart illustrating the processing flow of the identification means in a conventional disk drive;

DETAILED DESCRIPTION OF THE PREFERRED EMBODIMENT

A preferred embodiment of the disk drive of the invention will now be described with reference to the accompanying drawings.

Figure 1:
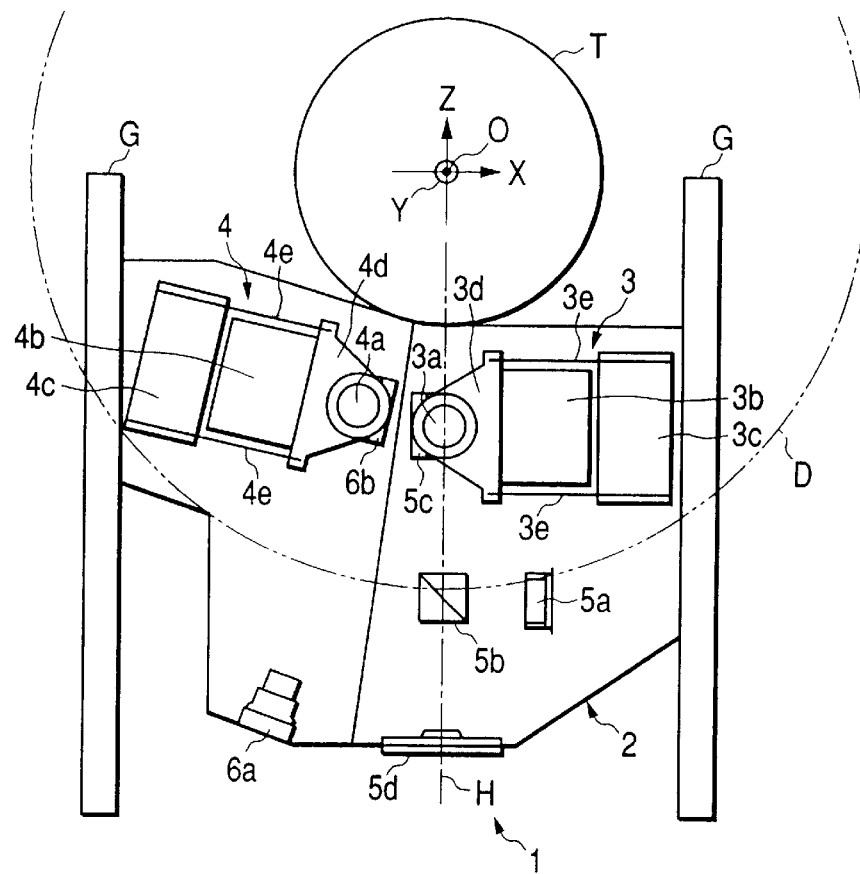
FIG. 1 is a plan view illustrating the optical head and the related area of the disk drive of the invention.
Figure 2:
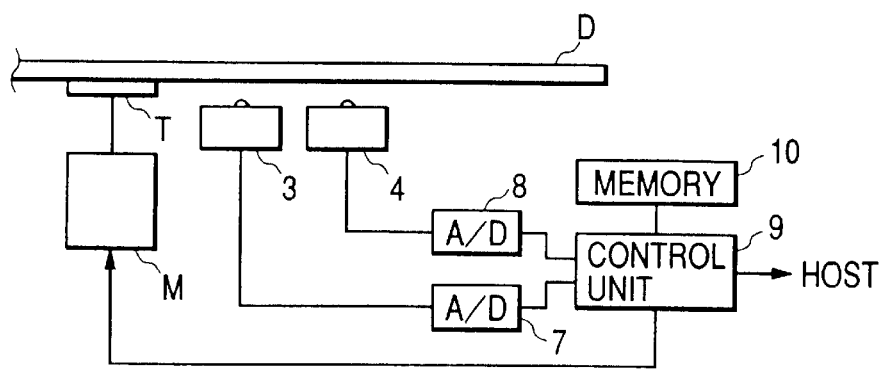
FIG. 2 is a block diagram of the circuit in the disk drive of the invention.
Figure 3:
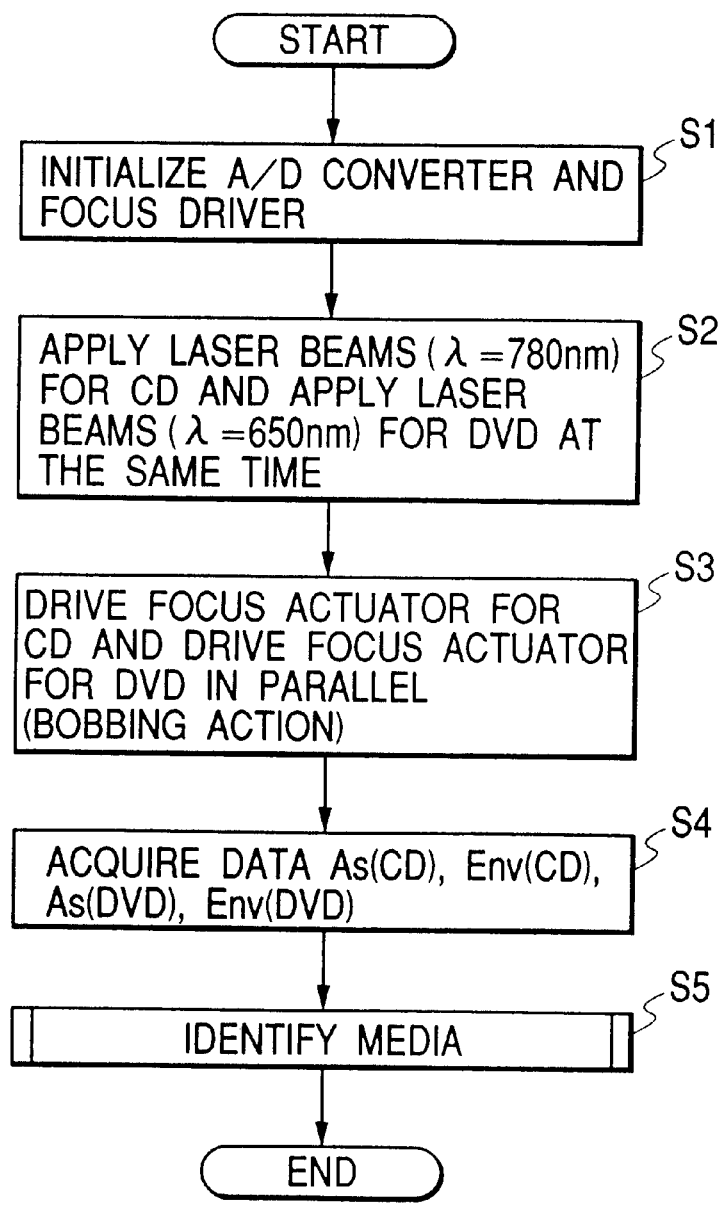
FIG. 3 is a flow chart illustrating the processing flow of the identification means in the disk drive.
Figure 4:
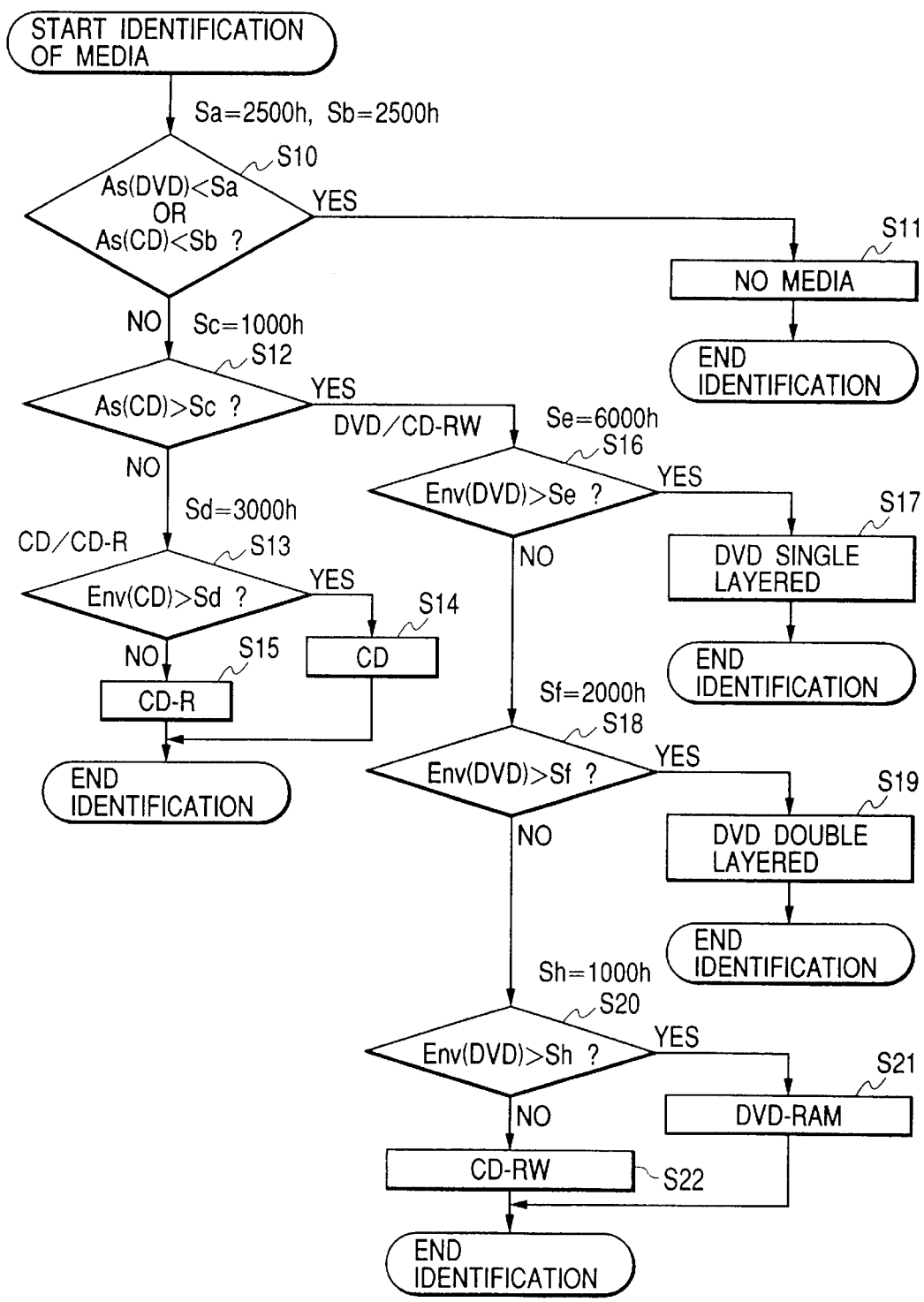
FIG. 4 is a flow chart illustrating the processing flow of the identification of the different specifications of the disks.

FIG. 1 is a plan view illustrating the optical head and the related area of the disk drive of the invention, FIG. 2 is a block diagram illustrating the circuit configuration in the disk drive, FIG. 3 is a flow chart illustrating the processing in the disk drive, and FIG. 4 is a flow chart illustrating the flow of the identification of the different specifications of the disks.

The disk drive shown below is able to use the CD and the DVD as an example, which incorporates an optical head 3 for CD and an optical head 4 for DVD. Further, the disk drive is able to selectively incorporate the optical heads appropriately that conform to the specifications of the CD-ROM, CD-R, CD-RW, etc., as for the CD, and the DVD-ROM, DVD-R, DVD-RAM, etc., as for the DVD.

An optical head unit 1 as shown in FIG. 1 is provided with the optical head 3 for CD and the optical head 4 for DVD are provided on a carriage 2. The carriage 2 is supported by guides G, G provided on both sides of the carriage 2. The guides G, G are fixed on a mechanism chassis of the optical head unit 1. The mechanism chassis is provided with a drive means (thread drive means) for a motor, etc., whereby the carriage 2 travels in the radial direction of an optical disk D. Thereby, the optical heads 3 and 4 moves in an integrated manner radially from the inside toward the outside of the optical disk D.

Further, near the optical head unit 1, a turntable T that mounts the optical disk D is provided to form a rotation drive means. The other mechanisms such as a spindle motor M (see FIG. 2) that drives to rotate the optical disk D (turntable T), and the drive means (thread drive means) that moves the optical head unit 1 in the radial direction of the disk, etc., use the conventional general ones.

The optical head 3 is provided with an objective lens 3a, drive correction means 3b, support part 3c, lens holder 3d that holds the objective lens 3a, wires 3e, 3e that elastically support the lens holder 3d in the overhung state, light emitting element 5a, beam splitter 5b, reflector 5c, and light receiving element 5d.

The objective lens 3a is elastically supported in the overhung state to the support part 3c by the wires 3e, 3e.

Here, the wires 3e, 3e are provided on both the sides of the drive correction means 3b by two pieces each, and the objective lens 3a is supported by four wires in total.

The drive correction means 3b is provided with a coil and magnet for tracking correction control, whereby the objective lens 3a is moved in the tracking direction (Z direction); and it is provided with a coil and magnet for focusing correction control, whereby the objective lens 3a is moved in the focusing direction (Y direction). For example, the coils for tracking correction control and focusing correction control are fixed on the carriage 2 as well as on the support part 3c, and the magnets are fixed to the lens holder 3d that holds the objective lens 3a.

The light emitting element (light source) 5a emits laser beams (detection beams) of the wavelength 780 nm. The laser beams emitted by the light emitting element 5a are irradiated onto the beam splitter 5b, which are reflected toward the objective lens 3a. Here, the intensity of the laser beams emitted by the light emitting element 5a is monitored by a monitoring device (not illustrated), whereby the intensity of the laser beams is controlled and adjusted.

Further, a collimator lens (not illustrated) is provided on the optical path between the light emitting element 5a and the objective lens 3a, and the collimator lens makes the laser beams from the light emitting element 5a in parallel beams. Further, the reflector 5c (only a part illustrated) includes a prism and mirror, etc., which is installed under the objective lens 3a, and it reflects the beams bidirectionally between the objective lens 3a and the collimator lens.

The laser beams are reflected toward the objective lens 3a by the reflector 5c, and the laser beams focused by the objective lens 3a irradiate a pit on the track. The laser beams reflected on the optical disk D pass the reflector 5c and collimator lens again, but the beam splitter 5b does not reflect the beams passing them instead, and the light receiving element 5d detects the state of the laser beams. From the state of the laser beams irradiating the light receiving element 5d, the signal recorded on the disk, the focusing error, and the tracking error are detected.

Here, the three beam method is adopted to the optical head 3 as the tracking correction method. That is, the laser beams emitting from the light emitting element 5a irradiate the recording surface of the disk to form three spots. The signal is detected by the reflected light from the center spot. The tracking error signal is acquired by calculating the difference between the reflected light intensities from the two sub-spots on both the sides.

On the other hand, the optical head 4 for DVD is provided with an objective lens 4a, drive correction means 4b, support part 4c, lens holder 4d that holds the objective lens 4a, wires 4e, 4e that elastically support the lens holder 4d in the overhung state, composite element 6a, and reflector 6b.

The layout of the objective lens 4a, drive correction means 4b, support part 4c, lens holder 4d, and wires 4e, 4e is designed in the substantially same manner as the optical head 3 for CD.

The composite element 6a has both the functions of the light emitting element and light receiving element, which includes the light emitting element (light source) such as a semiconductor laser, the light receiving element such as a pin photo diode, and an element such as a receiving lens.

The laser beams emitted from the composite element 6a are transformed into parallel beams by the collimator lens (not illustrated), and the parallel beams are reflected toward the objective lens 4a by the reflector 6b installed under the objective lens 4a. The laser beams falling on the objective lens 4a are focused by the objective lens 4a to be irradiated on a pit (recording layer) on the track of the optical disk D. And, the laser beams reflected on the optical disk D pass the objective lens 4a, the reflector 6b, and collimator lens, returning to the composite element 6a.

Here, the phase difference method is adopted to the optical head 4 as the tracking correction method. On the basis of the phase difference detected in the composite element 6a, the tracking correction control coil is given a correction current to drive the lens holder 4d and the objective lens 4a in the direction that the tracking error is corrected. Also, on the basis of the focus error signal detected in the composite element 6a, the focusing correction control coil is given a correction current to drive the objective lens 4a in the direction that the focusing error is corrected.

In the optical head 1 mounted on the disk drive of this invention, the center of the objective lens 3a provided to the optical head 3 moves on the normal line H of the optical disk D, as shown in FIG. 1. In contrast to this, the objective lens 4a provided to the optical head 4 is disposed at a slight to the optical head 3. That is, the center of the objective lens 3a of the optical head 3 for CD, which detects the tracking error in the three beam method having a slight allowance to the angle offset, moves on the normal line; and the center of the objective lens 4a of the optical head 4 for DVD, which detects the tracking error in the phase difference method having a high allowance to the angle offset, moves on the position detached from the normal line. Here, the optical head unit may be provided with a switching means that switches the disposition of the optical head so that the center of the objective lens mounted on each optical head always moves on the normal line H of the optical disk D. Alternatively, the optical head unit may be provided with a mechanism such that the optical heads are disposed in a straight line on both the sides of the center of the optical disk D, while the switching means is not provided, whereby the centers of the objective lenses of the optical heads each move on the normal line of the optical disk D.

As shown in FIG. 2, the disk drive is loaded with the optical disk D such as a CD or a DVD, and when the optical disk D is mounted on the turntable T, the spindle motor M is driven to rotate the optical disk D. At that moment, a control unit 9 sends out a specific signal, whereby the optical disk D is rotated through a driver (not illustrated).

When the optical disk D is loaded, the two optical heads 3 and 4 operate simultaneously, and the light sources provided to the optical heads 3 and 4 individually irradiate the laser beams of specific wavelengths simultaneously to the optical disk D. The laser beams each returned from the optical disk D, which are analog signals, are converted into digital signals by A/D converters 7, 8, and the digital signals each are recorded in a memory 10. The signals recorded in the memory 10 are sent to the control unit 9 that functions as the identification means, which performs a specific operation for identifying the optical disk D loaded.

After the specification (type) of the disk loaded is identified by the control unit 9, in correspondence with the specification of the disk identified, either the optical head 3 or the optical head 4 starts the read operation or the write operation. Here, the other optical head is halted.

The identification of the specification of the optical disk D in the foregoing disk drive is executed by the processing shown in FIG. 3 and FIG. 4. Here, the disk drive is able to identify the CD-ROM, CD-R, CD-RW, DVD-ROM (single recording layer), DVD-ROM (double recording layer) and DVD-RAM.

As shown in FIG. 3, when the optical disk for CD or the optical disk for DVD is loaded in the disk drive, the A/D converters 7,8 and the focus drivers are initialized to thereby eliminate the offset components and the noise components (S1: step 1). At this moment, the focus drive mechanisms of the optical heads each are not locked yet, and the laser detection beams are not irradiated either.

After the initialization of the drivers, the laser beams of the wavelength 780 nm from the light emitting element (light source) provided to the optical head 3 for CD and the laser beams of the wavelength 650 nm from the composite element 6a (light emitting element: light source) provided to the optical head 4 for DVD are simultaneously irradiated through the optical systems of the optical heads each toward the optical disk D (S2).

Next, the loaded optical disk is rotated by the rotation drive means, and the focus actuators of both the optical heads 3 and 4 are energized to drive the objective lenses 3a and 4a simultaneously toward the focusing direction (S3). Here, the objective lenses 3a and 4a are driven to make a reciprocating motion toward the recording surface of the disk at least one time in a low speed (bobbling motion).

The signals by the reflected beams from the optical disk D are received to be detected by the respective light receiving systems of the optical heads 3 and 4, and the detected electric signals are converted into the digital signals by the A/D converters 7,8 which are acquired by the control unit 9. At this moment, in each of the optical head 3 and the optical head 4, the control unit 9 detects the peak values of all the signals added (As) being the total of the quantity of light of the reflected light detected, which are stored in the memory 10. Further, when the optical heads 3 and 4 are driven to make the bobbling motions, the signals recorded in the disk at the focused point are detected, and the RF envelopes (Env) are obtained (S4). The peak-to-peak values of the RF envelopes are stored in the memory 10.

The control unit (identification unit) 9 executes a specified operation using the peak values of As and the peak-to-peak values of Env which are acquired by the processing at step S4, and identifies the disk loaded in the disk drive as the CD, DVD, or CD-ROM, CD-R, CD-RW of the CD, or further DVD-ROM (single layer, double layer), DVD-RAM of the DVD (S5).

In the flow chart shown in FIG. 4, the peak value of all the signals added is indicated by As (CD), and the peak-to-peak value of the RF envelope is indicated by Env (CD), which are acquired by the optical head 3 through the detection processing shown in FIG. 3; and the peak value of all the signals added is indicated by As (DVD), and the peak-to-peak value of the RF envelope is indicated by Env (DVD), which are acquired by the optical head 4.

In the flow chart shown in FIG. 4, first at S10, whether or not an optical disk is loaded is checked. That is, if each of As (CD), As (DVD) is smaller than the preset reference Sa, Sb, respectively (Yes), the optical disk is judged not to be loaded (S11), and the identification processing is terminated. And, if each of As (CD), As (DVD) is equal to or larger than the preset reference Sa, Sb, respectively, the optical disk is judged to be loaded, and the process advances to S12. Here, the reference values Sa and Sb each are given the same data of 2500h on the basis of the data acquired from the actual measurement. Further, the reference values Sc through Sh shown below are also acquired from the actual measurement. These actual measurements are stored in advance in the memory 10 or in the storage area of the control unit 9.

When the optical disk is judged to be loaded at S10, the steps after S12 identify the type of the disk.

At S12, if As (CD) is equal to or smaller than the reference Sc (1000h) (No), the optical disk D loaded is judged to be either the CD-ROM or the CD-R. Further at S13, if Env (CD) is larger than the reference Sd (3000h), the optical disk D loaded is determined to be the CD-ROM (S14); and if Env (CD) is equal to or smaller than the reference Sd, it is determined to be the CD-R (S15). And, the processing terminates the identification, and enters a standby state until the host computer sends a signal for reproduction or recording.

At S12, if As (CD) is larger than the reference Sc (1000h) (Yes), the optical disk D loaded is judged to be either the DVD system (DVD-ROM with single recording layer, DVD-ROM with double recording layer, DVD-RAM) or the CD-RW. Further at S16, if Env (DVD) is larger than the reference Se (6000h) (Yes), the optical disk D loaded is determined to be the DVD-ROM with single recording layer (S17), and the identification processing is terminated.

Further at S16, if Env (DVD) is equal to or smaller than the reference Se (No), it is judged to be either the DVD-ROM with double recording layer, DVD-RAM or the CD-RW.

At S18, if Env (DVD) is larger than the reference Sf (2000h) (Yes), the optical disk D loaded is determined to be the DVD-ROM with double recording layer (S19), and the identification processing is terminated. Further at S18, if Env (DVD) is equal to or smaller than the reference Sf (No), it is judged to be either the DVD-RAM or the CD-RW, and the process advances to S20.

At S20, if Env (DVD) is larger than the reference Sh (1000h) (Yes), the optical disk D loaded is determined to be the DVD-RAM (S21), and the identification processing is terminated. Further at S20, if Env (DVD) is equal to or smaller than the reference Sh (No), it is determined to be the CD-RW, and the whole processing is completed.

The disk drive of the invention is not limited to the aforementioned embodiment, and it may also be provided with an identification means that identifies the disks having the other specifications than those already mentioned. Further, the invention can also be applied to a disk drive that incorporates the light sources of more than three different wavelengths.

Further, the invention is not limited to the identification of the disks of the CD system and the DVD system, and as long as the disk can be read and/or written by the optical head, it may be applied to the identification of the disks of the other specifications.

Further, in the flow chart shown in FIG. 4, the order of identifying the optical disks can appropriately be modified by modifying the reference values.

According to the invention thus described, although plural light sources having different wavelengths are mounted, the detection beams are irradiated simultaneously from the plural light sources, and the specification of the disk is identified by the reflected light; accordingly, the time required for the identification of the specification can be reduced, compared to the conventional disk drive.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A disk drive comprising a plurality of optical heads each provided with light emitting systems and light receiving systems and drivers that drive objective lenses to condense lights on a media in a focusing direction and a tracking direction, in which the light emitting systems of a plurality of the optical heads are provided with light sources each capable of emitting light of different wavelengths, wherein when a media is loaded, the light emitting systems of a plurality of the optical heads simultaneously irradiate emitter lights to the media, and the light receiving systems of the optical heads each detect reflected lights from the media;

and the disk drive further comprises a memory that stores light receiving signals detected by the light receiving systems of the optical head and an identification mechanism that judges values stored by the memory and identifies a type of the loaded media.

2. A disk drive as claimed in claim 1, wherein a plurality of the optical heads each drive the objective lenses simultaneously in the focusing direction at least one time, and the memory stores peak values of total quantities of lights (all the signals added) of the reflected lights received by the light receiving systems of the optical heads each and peak values of RF envelopes obtained when the detection lights are focused on the media.

3. A disk drive as claimed in claim 2, wherein the identification mechanism compares all the signals added with preset reference values to thereby judge whether the media is loaded.

4. A disk drive as claimed in claim 2, wherein one of the peak values of all the signals added and the peak values of the RF envelopes are compared with preset reference values to identify specifications of the media.

5. A disk drive as claimed in claim 3, wherein the reference values are obtained from actual measurements and stored to be read out by the identification mechanism.

6. A disk drive as claimed in claim 4, wherein the reference values are obtained from actual measurements and stored to be read out by the identification mechanism.

* * * * *

UNITED STATES PATENT AND TRADEMARK OFFICE
CERTIFICATE OF CORRECTION

PATENT NO.     : 6,628,593 B1                                                          Page 1 of 1
DATED          : September 30, 2003
INVENTOR(S)    : Tatsumaro Yamashita et al.

It is certified that error appears in the above-identified patent and that said Letters Patent is hereby corrected as shown below:

Column 8,
Line 17, delete "emitter" and substitute -- emitted -- in its place.
Line 22, delete "head" and substitute -- heads -- in its place.

Signed and Sealed this

Twenty-seventh Day of January, 2004

JON W. DUDAS
*Acting Director of the United States Patent and Trademark Office*